United States Patent
Uematsu

(10) Patent No.: US 10,417,242 B2
(45) Date of Patent: Sep. 17, 2019

(54) MOTOR SELECTION METHOD AND MOTOR SELECTION PROGRAM

(71) Applicant: FANUC CORPORATION, Yamanashi (JP)

(72) Inventor: Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/915,810

(22) Filed: Mar. 8, 2018

(65) Prior Publication Data

US 2018/0267972 A1   Sep. 20, 2018

(30) Foreign Application Priority Data

Mar. 14, 2017 (JP) .................. 2017-048960

(51) Int. Cl.
  *G06F 16/00*     (2019.01)
  *G06F 16/2457*   (2019.01)
  *G06F 16/28*     (2019.01)
  *G05B 19/042*    (2006.01)

(52) U.S. Cl.
  CPC ... *G06F 16/24578* (2019.01); *G05B 19/0426* (2013.01); *G06F 16/285* (2019.01)

(58) Field of Classification Search
  None
  See application file for complete search history.

(56) References Cited

U.S. PATENT DOCUMENTS

| | | |
|---|---|---|
| 9,600,611 B2 | 3/2017 | Miura |
| 10,102,314 B2 | 10/2018 | Miura et al. |
| 2016/0139583 A1* | 5/2016 | Miura ............... G06F 17/5009 318/569 |

FOREIGN PATENT DOCUMENTS

| | | |
|---|---|---|
| CN | 101181929 A | 5/2008 |
| CN | 104537244 A | 4/2015 |
| CN | 104396140 B | 2/2017 |
| JP | 2006042589 A | 2/2006 |
| JP | 4711120 B2 | 6/2011 |
| JP | 2015027244 A | 2/2015 |
| WO | 2015129030 A1 | 9/2015 |

* cited by examiner

*Primary Examiner* — Son T Hoang
(74) *Attorney, Agent, or Firm* — RatnerPrestia

(57) ABSTRACT

A motor selection method includes: referring to a database containing data pertaining to rated speeds, continuous rated torques, and upper limit values of load inertia moment of a plurality of motors; dividing the database, based on the upper limit values of load inertia moment; obtaining information pertaining to a required rotation speed, continuous rated torque, and load inertia moment; selecting one group from a plurality of groups; and selecting a motor meeting the following conditions.

rotation speed required of motor≤rated speed continuous torque required of motor≤continuous rated torque load inertia moment required of motor≤upper limit value of load inertia moment.

20 Claims, 25 Drawing Sheets

FIG. 4A

SERVO MOTOR DATA GROUP (GROUP 1)

|  | CONTINUOUS RATED TORQUE | RATED SPEED | UPPER LIMIT VALUE OF LOAD INERTIA MOMENT |
| --- | --- | --- | --- |
| SERVO MOTOR 1 | 1 Nm | 1000 min$^{-1}$ | 0.0001 kgm$^2$ |
| SERVO MOTOR 2 | 2 Nm | 1000 min$^{-1}$ | 0.0002 kgm$^2$ |
| SERVO MOTOR 3 | 2 Nm | 2000 min$^{-1}$ | 0.0002 kgm$^2$ |
| SERVO MOTOR 4 | 3 Nm | 2000 min$^{-1}$ | 0.0003 kgm$^2$ |
| SERVO MOTOR 5 | 6 Nm | 2000 min$^{-1}$ | 0.0006 kgm$^2$ |

FIG. 4B

SERVO MOTOR DATA GROUP (GROUP 2)

|  | CONTINUOUS RATED TORQUE | RATED SPEED | UPPER LIMIT VALUE OF LOAD INERTIA MOMENT |
| --- | --- | --- | --- |
| SERVO MOTOR 6 | 1 Nm | 1000 min$^{-1}$ | 0.001 kgm$^2$ |
| SERVO MOTOR 7 | 2 Nm | 1000 min$^{-1}$ | 0.002 kgm$^2$ |
| SERVO MOTOR 8 | 2 Nm | 2000 min$^{-1}$ | 0.002 kgm$^2$ |
| SERVO MOTOR 9 | 3 Nm | 2000 min$^{-1}$ | 0.003 kgm$^2$ |
| SERVO MOTOR 10 | 6 Nm | 2000 min$^{-1}$ | 0.006 kgm$^2$ |

FIG. 6A

SERVO MOTOR DATA GROUP (GROUP 1)

|  | CONTINUOUS RATED TORQUE | RATED SPEED | ROTOR INERTIA MOMENT |
| --- | --- | --- | --- |
| SERVO MOTOR 1 | 1 Nm | 1000 min$^{-1}$ | 0.00001 kgm$^2$ |
| SERVO MOTOR 2 | 2 Nm | 1000 min$^{-1}$ | 0.00002 kgm$^2$ |
| SERVO MOTOR 3 | 2 Nm | 2000 min$^{-1}$ | 0.00002 kgm$^2$ |
| SERVO MOTOR 4 | 3 Nm | 2000 min$^{-1}$ | 0.00003 kgm$^2$ |
| SERVO MOTOR 5 | 6 Nm | 2000 min$^{-1}$ | 0.00006 kgm$^2$ |

FIG. 6B

SERVO MOTOR DATA GROUP (GROUP 2)

|  | CONTINUOUS RATED TORQUE | RATED SPEED | ROTOR INERTIA MOMENT |
| --- | --- | --- | --- |
| SERVO MOTOR 6 | 1 Nm | 1000 min$^{-1}$ | 0.0001 kgm$^2$ |
| SERVO MOTOR 7 | 2 Nm | 1000 min$^{-1}$ | 0.0002 kgm$^2$ |
| SERVO MOTOR 8 | 2 Nm | 2000 min$^{-1}$ | 0.0002 kgm$^2$ |
| SERVO MOTOR 9 | 3 Nm | 2000 min$^{-1}$ | 0.0003 kgm$^2$ |
| SERVO MOTOR 10 | 6 Nm | 2000 min$^{-1}$ | 0.0006 kgm$^2$ |

FIG. 10A

SERVO MOTOR DATA GROUP (GROUP 1)

|  | CONTINUOUS RATED TORQUE | RATED SPEED | UPPER LIMIT VALUE OF LOAD INERTIA MOMENT | INSTANTANEOUS MAXIMUM TORQUE |
|---|---|---|---|---|
| SERVO MOTOR 1 | 1 Nm | 1000 min$^{-1}$ | 0.0001 kgm$^2$ | 4 Nm |
| SERVO MOTOR 2 | 2 Nm | 1000 min$^{-1}$ | 0.0002 kgm$^2$ | 8 Nm |
| SERVO MOTOR 3 | 2 Nm | 2000 min$^{-1}$ | 0.0002 kgm$^2$ | 8 Nm |
| SERVO MOTOR 4 | 3 Nm | 2000 min$^{-1}$ | 0.0003 kgm$^2$ | 12 Nm |
| SERVO MOTOR 5 | 6 Nm | 2000 min$^{-1}$ | 0.0006 kgm$^2$ | 24 Nm |

FIG. 10B

SERVO MOTOR DATA GROUP (GROUP 2)

|  | CONTINUOUS RATED TORQUE | RATED SPEED | UPPER LIMIT VALUE OF LOAD INERTIA MOMENT | INSTANTANEOUS MAXIMUM TORQUE |
|---|---|---|---|---|
| SERVO MOTOR 6 | 1 Nm | 1000 min$^{-1}$ | 0.001 kgm$^2$ | 4 Nm |
| SERVO MOTOR 7 | 2 Nm | 1000 min$^{-1}$ | 0.002 kgm$^2$ | 8 Nm |
| SERVO MOTOR 8 | 2 Nm | 2000 min$^{-1}$ | 0.002 kgm$^2$ | 8 Nm |
| SERVO MOTOR 9 | 3 Nm | 2000 min$^{-1}$ | 0.003 kgm$^2$ | 12 Nm |
| SERVO MOTOR 10 | 6 Nm | 2000 min$^{-1}$ | 0.006 kgm$^2$ | 24 Nm |

SERVO MOTOR DATA GROUP (GROUP 1)

| | CONTINUOUS RATED TORQUE | RATED SPEED | UPPER LIMIT VALUE OF LOAD INERTIA MOMENT | INSTANTANEOUS MAXIMUM TORQUE AND ROTATION SPEED |
|---|---|---|---|---|
| SERVO MOTOR 1 | 1 Nm | 1000 min$^{-1}$ | 0.0001 kgm$^2$ | (4/0)-(4/500)-(2/1000) |
| SERVO MOTOR 2 | 2 Nm | 1000 min$^{-1}$ | 0.0002 kgm$^2$ | (8/0)-(8/500)-(4/1000) |
| SERVO MOTOR 3 | 2 Nm | 2000 min$^{-1}$ | 0.0002 kgm$^2$ | (8/0)-(8/1000)-(4/2000) |
| SERVO MOTOR 4 | 3 Nm | 2000 min$^{-1}$ | 0.0003 kgm$^2$ | (12/0)-(12/1000)-(6/2000) |
| SERVO MOTOR 5 | 6 Nm | 2000 min$^{-1}$ | 0.0006 kgm$^2$ | (24/0)-(24/1000)-(12/2000) |

FIG. 12A

SERVO MOTOR DATA GROUP (GROUP 2)

| | CONTINUOUS RATED TORQUE | RATED SPEED | UPPER LIMIT VALUE OF LOAD INERTIA MOMENT | INSTANTANEOUS MAXIMUM TORQUE AND ROTATION SPEED |
|---|---|---|---|---|
| SERVO MOTOR 6 | 1 Nm | 1000 min$^{-1}$ | 0.001 kgm$^2$ | (4/0)-(4/500)-(2/1000) |
| SERVO MOTOR 7 | 2 Nm | 1000 min$^{-1}$ | 0.002 kgm$^2$ | (8/0)-(8/500)-(4/1000) |
| SERVO MOTOR 8 | 2 Nm | 2000 min$^{-1}$ | 0.002 kgm$^2$ | (8/0)-(8/1000)-(4/2000) |
| SERVO MOTOR 9 | 3 Nm | 2000 min$^{-1}$ | 0.003 kgm$^2$ | (12/0)-(12/1000)-(6/500) |
| SERVO MOTOR 10 | 6 Nm | 2000 min$^{-1}$ | 0.006 kgm$^2$ | (24/0)-(24/1000)-(12/2000) |

SERVO MOTOR DATA GROUP (GROUP 1)

|  | CONTINUOUS RATED TORQUE | RATED SPEED | UPPER LIMIT VALUE OF LOAD INERTIA MOMENT | BRAKE HOLDING TORQUE |
|---|---|---|---|---|
| SERVO MOTOR 1 | 1 Nm | 1000 min$^{-1}$ | 0.0001 kgm$^2$ | 2 Nm |
| SERVO MOTOR 2 | 2 Nm | 1000 min$^{-1}$ | 0.0002 kgm$^2$ | 2 Nm |
| SERVO MOTOR 3 | 2 Nm | 2000 min$^{-1}$ | 0.0002 kgm$^2$ | 2 Nm |
| SERVO MOTOR 4 | 3 Nm | 2000 min$^{-1}$ | 0.0003 kgm$^2$ | 2 Nm |
| SERVO MOTOR 5 | 6 Nm | 2000 min$^{-1}$ | 0.0006 kgm$^2$ | 6 Nm |

FIG. 16B

SERVO MOTOR DATA GROUP (GROUP 2)

|  | CONTINUOUS RATED TORQUE | RATED SPEED | UPPER LIMIT VALUE OF LOAD INERTIA MOMENT | BRAKE HOLDING TORQUE |
|---|---|---|---|---|
| SERVO MOTOR 6 | 1 Nm | 1000 min$^{-1}$ | 0.001 kgm$^2$ | 2 Nm |
| SERVO MOTOR 7 | 2 Nm | 1000 min$^{-1}$ | 0.002 kgm$^2$ | 2 Nm |
| SERVO MOTOR 8 | 2 Nm | 2000 min$^{-1}$ | 0.002 kgm$^2$ | 2 Nm |
| SERVO MOTOR 9 | 3 Nm | 2000 min$^{-1}$ | 0.003 kgm$^2$ | 2 Nm |
| SERVO MOTOR 10 | 6 Nm | 2000 min$^{-1}$ | 0.006 kgm$^2$ | 6 Nm |

MOTOR SELECTION METHOD AND MOTOR SELECTION PROGRAM

This application is a new U.S. patent application that claims benefit of JP 2017-048960 filed on Mar. 14, 2017, the content of 2017-048960 is incorporated herein by reference.

BACKGROUND OF THE INVENTION

1. Field of the Invention

The present invention relates to a motor selection method and a motor selection program.

2. Description of the Related Art

A servo motor selection method used when designing a servo system has been known thus far (e.g., Japanese Unexamined Patent Publication (Kokai) No. JP 2006-42589 A). The servo motor selection method according to the related art is a servo motor selection method that processes a servo system selection sequence for servo motor driving, processes a mechanical specification input sequence of a servo system, processes a movement pattern input sequence for a load of the servo system, processes a computation sequence for finding required specifications of a servo motor on the basis of output results of the servo system selection sequence, the mechanical specification input sequence, and the load movement pattern input sequence, and processes a search sequence for a servo motor suited to the servo system on the basis of the required specifications found in the computation sequence. With the servo motor selection method according to the related art, in the servo motor search sequence, a servo motor torque specification comparison sequence is processed after a servo motor speed specification comparison sequence is processed.

SUMMARY OF THE INVENTION

The related art has had problems in that it is difficult, and takes a long time, to select a motor matching all items such as rotation speed, continuous torque, and load inertia moment.

A motor selection method according to one embodiment of the present disclosure includes: referring to a database containing data pertaining to rated speeds, continuous rated torques, and upper limit values of load inertia moment of a plurality of motors; dividing the data contained in the database into a plurality of groups, based on the upper limit values of load inertia moment; obtaining information pertaining to a rotation speed, a continuous rated torque, and a load inertia moment required of a necessary motor; selecting one group from the plurality of groups; and selecting a motor meeting conditions:

rotation speed required of motor≤rated speed continuous torque required of motor≤continuous rated torque load inertia moment required of motor≤upper limit value of load inertia moment by using the data included in the selected group.

A motor selection program according to another embodiment of the present disclosure causes a computer to execute: a database reference sequence of referring to a database containing data pertaining to rated speeds, continuous rated torques, and upper limit values of load inertia moment of a plurality of motors; a group dividing sequence of dividing the data contained in the database into a plurality of groups, based on the upper limit values of load inertia moment; a required specification obtainment sequence of obtaining information pertaining to a rotation speed, a continuous rated torque, and a load inertia moment required of a necessary motor; a group selection sequence of selecting one group from the plurality of groups; and a motor selection sequence of selecting a motor meeting conditions:

rotation speed required of motor≤rated speed;

continuous torque required of motor≤continuous rated torque; and load inertia moment required of motor≤upper limit value of load inertia moment, by using the data included in the selected group.

BRIEF DESCRIPTION OF THE DRAWINGS

The objects, features and advantages of the present invention will become more apparent from the following description of the embodiments in connection with the accompanying drawings, wherein:

FIG. 4A is a chart illustrating an example of a data group in group 1 used in the motor selection method according to the first embodiment;

FIG. 4B is a chart illustrating an example of a data group in group 2 used in the motor selection method according to the first embodiment;

FIG. 6A is a chart illustrating an example of a data group in group 1 used in a motor selection method according to a second embodiment;

FIG. 6B is a chart illustrating an example of a data group in group 2 used in the motor selection method according to the second embodiment;

FIG. 10A is a chart illustrating an example of a data group in group 1 used in a motor selection method according to a fifth embodiment;

FIG. 10B is a chart illustrating an example of a data group in group 2 used in the motor selection method according to the fifth embodiment;

FIG. 12A is a chart illustrating an example of a data group in group 1 used in a motor selection method according to a sixth embodiment;

FIG. 12B is a chart illustrating an example of a data group in group 2 used in the motor selection method according to the sixth embodiment;

FIG. 16A is a chart illustrating an example of a data group in group 1 used in a motor selection method according to a eighth embodiment;

FIG. 16B is a chart illustrating an example of a data group in group 2 used in the motor selection method according to the eighth embodiment;

DETAILED DESCRIPTION

A motor selection method and a motor selection program according to examples of the present disclosure will be described hereinafter with reference to the drawings. Note, however, that the technical scope of the present invention is not limited to these embodiments, and extends to the invention as disclosed in the scope of the patent claims and their equivalents.

Figure 1:
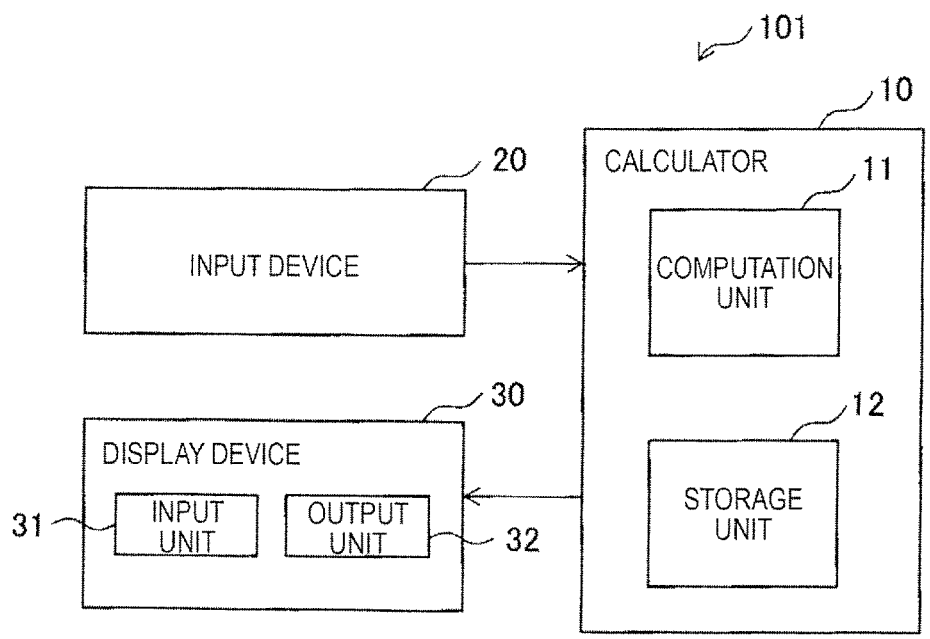
FIG. 1 is a block diagram illustrating a motor selection apparatus according to a first embodiment.

The embodiments describe a motor selection method and a motor selection program in the case where a servo motor is used as the motor. However, the motor is not limited thereto, and the motor selection method and the motor selection program according to the embodiments can also be applied in motors aside from servo motors. FIG. 1 is a block diagram of a motor selection apparatus that executes a motor selection method according to embodiments. A motor selection apparatus 101 includes a calculator (computer) 10, an input device 20, and a display device 30. The calculator 10 includes a computation unit 11 and a storage unit 12. The storage unit 12 is a hard disk (HDD), flash memory, etc., for example, and stores the motor selection program according to the embodiments. The computation unit 11 executes the motor selection program according to the embodiments, which is stored in the storage unit 12.

The display device 30 is provided with an input unit 31 and an output unit 32. The input unit 31 is displayed on a screen of the display device 30, and desired required motor specifications are inputted in the input unit 31. The output unit 32 is displayed on a screen of the display device 30, and a result of selecting a motor that meets the inputted required motor specifications is outputted in the output unit 32.

Figure 2:
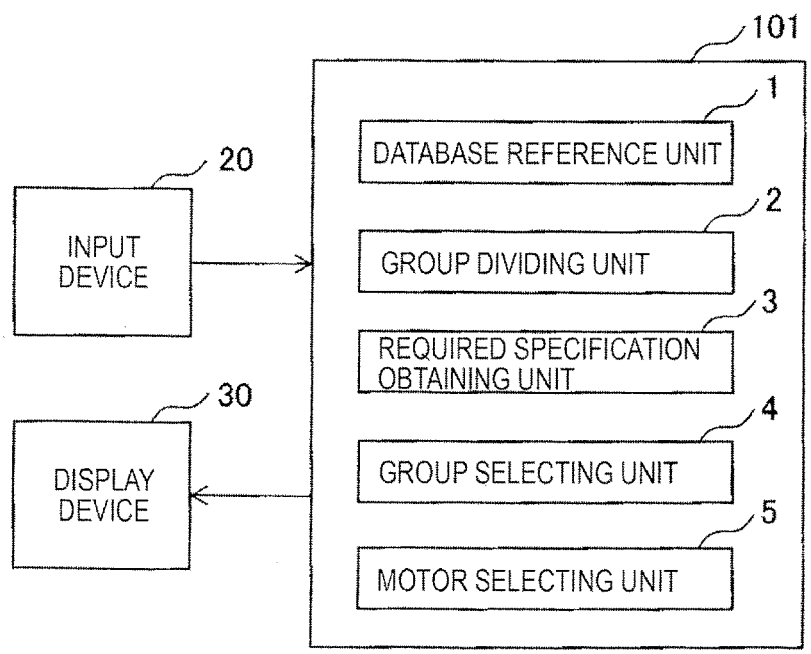
FIG. 2 is a function block diagram illustrating the motor selection apparatus according to the first embodiment.

FIG. 2 is a function block diagram illustrating the motor selection apparatus according to the embodiments. The motor selection apparatus 101 according to the embodiments includes a database reference unit 1, a group dividing unit 2, a required specification obtaining unit 3, a group selecting unit 4, and a motor selecting unit 5.

A keyboard, a mouse, etc., for example, can be used as the input device 20. Information pertaining to desired required motor specifications is inputted to the motor selection apparatus 101 through the input device 20.

A liquid-crystal display device, an organic EL display device, etc., can be used as the display device 30.

Figure 3:
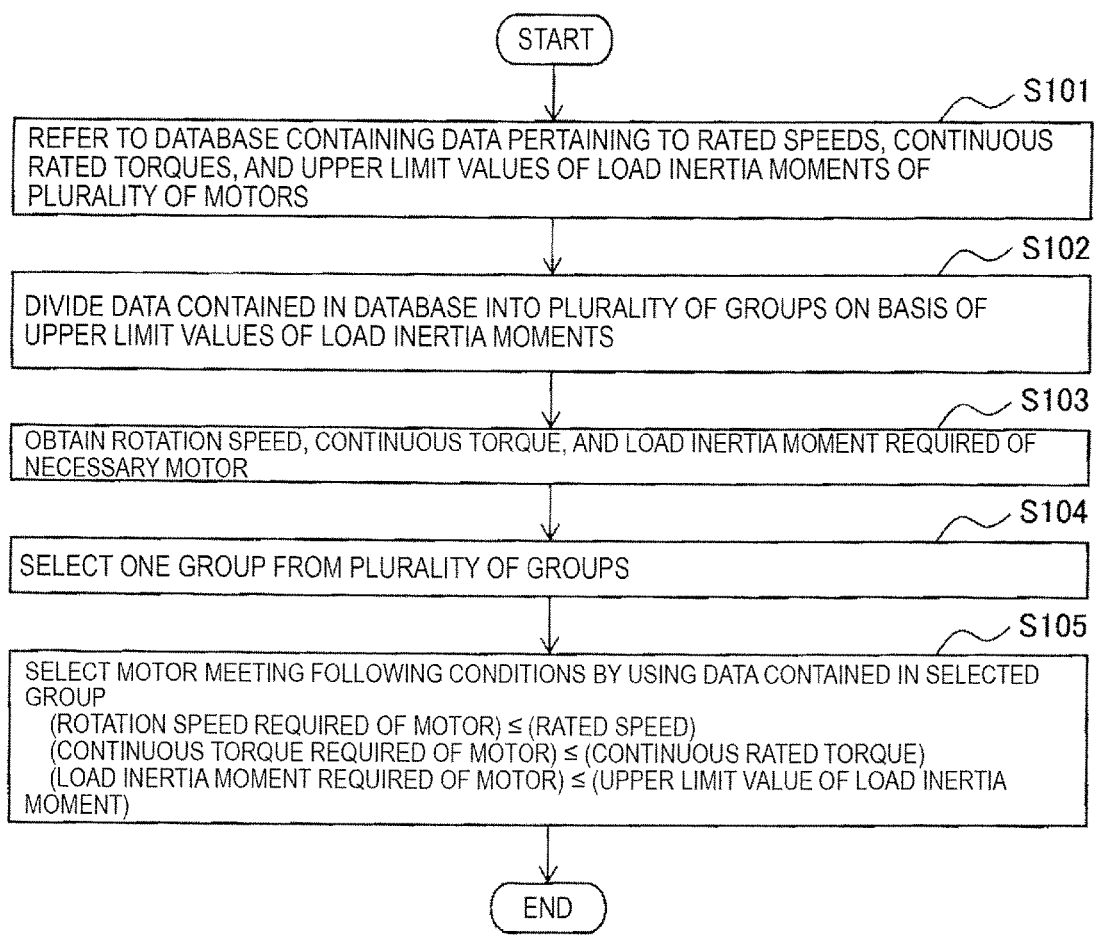
FIG. 3 is a flowchart illustrating a motor selection sequence in a motor selection method according to the first embodiment.

FIG. 3 is a flowchart illustrating a motor selection sequence in the motor selection method according to a first embodiment.

In step S101, the database reference unit 1 refers to a database containing data pertaining to rated speeds, continuous rated torques, and upper limit values of load inertia moments of a plurality of motors (a database reference process).

Next, in step S102, the group dividing unit 2 divides the data contained in the database into a plurality of groups on the basis of the upper limit values of the load inertia moments (a group dividing process).

FIGS. 4A and 4B illustrate examples of data groups of groups 1 and 2, respectively, used in the motor selection method according to the first embodiment. Comparing the data groups of group 1 and group 2, the continuous rated torque and the rated speed are substantially equal. However, with respect to the upper limit value of the load inertia moment, the value in group 2 is approximately 10 times the value in group 1. In this manner, in the motor selection method according to the first embodiment, the data contained in the database used is divided into two groups on the basis of the upper limit value of the load inertia moment. Although this embodiment describes an example in which the database is divided into two groups, the embodiment is not limited thereto, and the database may be divided into three or more groups.

Next, in step S103, the required specification obtaining unit 3 obtains information pertaining to a rotation speed, continuous torque, and load inertia moment required of the necessary motor (a required specification obtainment process).

Figure 5A:
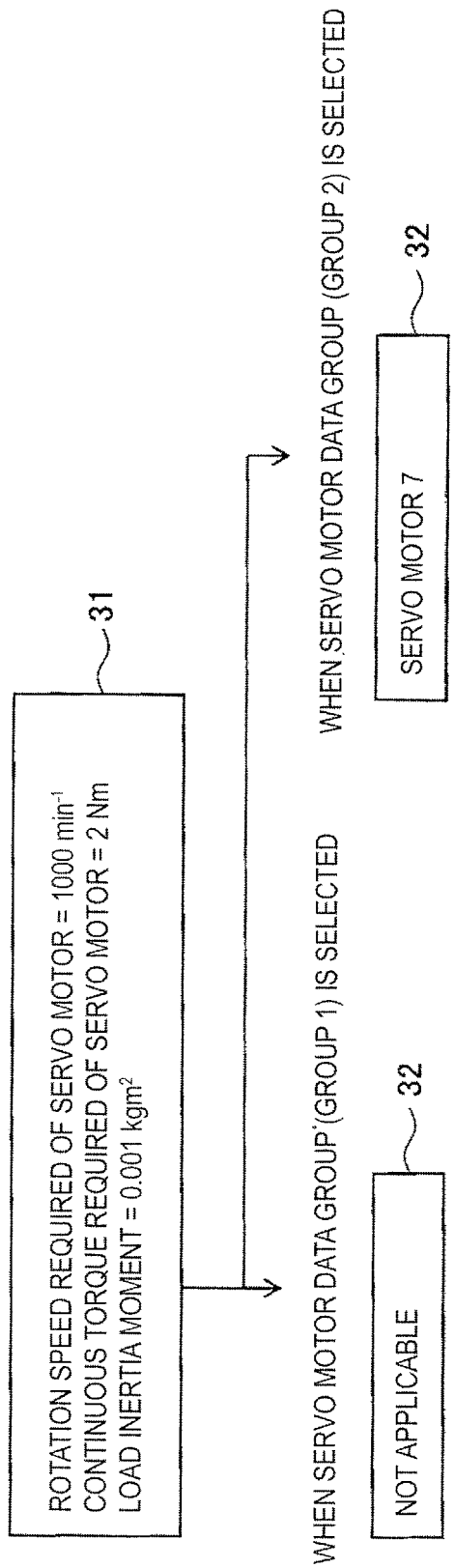
FIG. 5A is a diagram illustrating an example of required motor specifications and an output result from a selected motor, in the motor selection method according to the first embodiment.
Figure 5B:
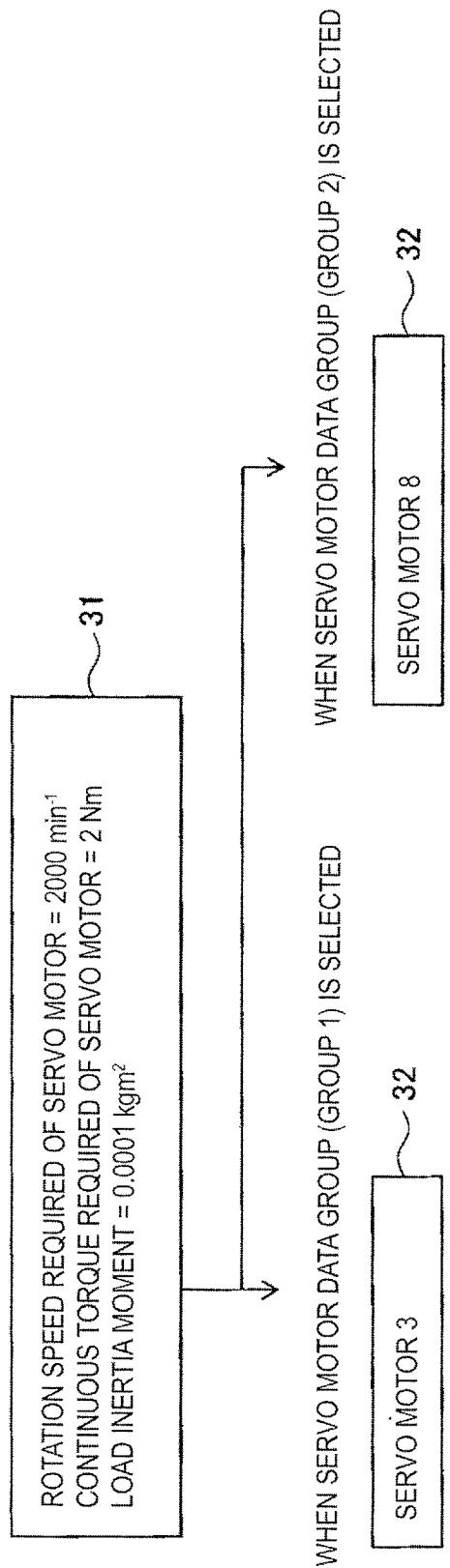
FIG. 5B is a diagram illustrating another example of required motor specifications and an output result from a selected motor, in the motor selection method according to the first embodiment.

FIG. 5A illustrates an example of required motor specifications and an output result from a selected motor, in the motor selection method according to the first embodiment. FIG. 5B illustrates another example of required motor specifications and an output result from a selected motor, in the motor selection method according to the first embodiment. As illustrated in FIG. 5A, for example, required specifications "rotation speed required of servo motor=1000 min$^{-1}$, continuous torque required of servo motor=2 Nm, load inertia moment=0.001 kgm$^2$" are inputted in the input unit 31 of the display device 30, and the required specification obtaining unit 3 obtains the values of the inputted rotation speed (1000 min$^{-1}$), continuous torque (2 Nm), and load inertia moment (0.001 kgm$^2$). Additionally, as another example, as illustrated in FIG. 5B, required specifications "rotation speed required of servo motor=2000 min$^{-1}$, continuous torque required of servo motor=2 Nm, load inertia moment=0.0001 kgm$^2$" are inputted in the input unit 31 of the display device 30, and the required specification obtaining unit 3 obtains the values of the inputted rotation speed (2000 min$^{-1}$), continuous torque (2 Nm), and load inertia moment (0.0001 kgm$^2$).

Next, in step S104, the group selecting unit 4 selects one group out of the plurality of groups (a group selection process). In this embodiment, group 1 or 2 is selected. The group selection can be carried out by inputting a desired group number in the input unit 31 of the display device 30.

Next, in step S105, the motor selecting unit 5 selects a motor that meets the following conditions by using the data contained in the selected group (a motor selection process).

(1) rotation speed required of motor≤rated speed
(2) continuous torque required of motor≤continuous rated torque
(3) load inertia moment required of motor≤upper limit value of load inertia moment First, an example of the motor selection method in the case where group 1 has been selected will be described with reference to FIGS. 4A and 5A. The rotation speed required of the servo motor is 1000 min$^{-1}$, and thus the servo motors meeting condition (1) are servo motors 1 to 5. Next, the continuous torque required of the servo motor is 2 Nm, and thus the servo motors meeting condition (2) are servo motors 2 to 5. Next, the load inertia moment required of the servo motor is 0.001 kgm$^2$, and thus there are no servo motors, among the servo motors 1 to 5, that meet condition (3). As such, there are no servo motors in group 1 that meet all of the conditions (1) to (3). Accordingly, in the case where group 1 has been selected as the servo motor data group, "not applicable" is displayed in the output unit 32 of the display device 30.

Next, an example of the motor selection method in the case where group 2 has been selected will be described with reference to FIGS. 4B and 5A. The rotation speed required of the servo motor is 1000 min$^{-1}$, and thus the servo motors meeting the condition (1) are servo motors 6 to 10. Next, the continuous torque required of the servo motor is 2 Nm, and thus the servo motors meeting the condition (2) are servo motors 7 to 10. Next, the load inertia moment required of the servo motor is 0.001 kgm$^2$, and thus the servo motors meeting the condition (3) are servo motors 6 to 10. As such, the servo motors that meet all of the conditions (1) to (3) are the servo motors 7 to 10. Here, all of the selected servo motors 7 to 10 can be displayed in the output unit 32 of the display device 30 as selection results. However, it is preferable that the selection candidates ultimately be narrowed down. Accordingly, in the case where a plurality of motors have been selected for each group, the motor, among the selected motors, that has the lowest continuous rated torque and the lowest rated speed may be selected. As a result, the servo motor 7, which has the lowest continuous rated torque at 2 Nm and the lowest rated speed at 1000 min$^{-1}$, is selected, and "servo motor 7" is displayed in the output unit 32 of the display device 30.

Next, another example of the motor selection method in the case where group 1 has been selected will be described with reference to FIGS. 4A and 5B. The rotation speed required of the servo motor is 2000 min$^{-1}$, and thus the servo motors meeting the condition (1) are servo motors 3 to 5. Next, the continuous torque required of the servo motor is 2 Nm, and thus the servo motors meeting the condition (2) are servo motors 2 to 5. Next, the load inertia moment required of the servo motor is 0.0001 kgm$^2$, and thus the servo motors meeting the condition (3) are servo motors 1 to 5. As such, the servo motors that meet all of the conditions (1) to (3) are the servo motors 3 to 5. Here, all of the selected servo motors 3 to 5 can be displayed in the output unit 32 of the display device 30 as selection results. However, it is preferable that the selection candidates ultimately be narrowed down. Accordingly, in the case where a plurality of motors have been selected for each group, the motor, among the selected motors, that has the lowest continuous rated torque and the lowest rated speed may be selected. As a result, the servo motor 3, which has the lowest continuous rated torque at 2 Nm and the lowest rated speed at 2000 min$^{-1}$, is selected, and "servo motor 3" is displayed in the output unit 32 of the display device 30.

Next, another example of the motor selection method in the case where group 2 has been selected will be described with reference to FIGS. 4B and 5B. The rotation speed required of the servo motor is 2000 min$^{-1}$, and thus the servo motors meeting the condition (1) are servo motors 8 to 10. Next, the continuous torque required of the servo motor is 2 Nm, and thus the servo motors meeting the condition (2) are servo motors 8 to 10. Next, the load inertia moment required of the servo motor is 0.0001 kgm$^2$, and thus the servo motors meeting the condition (3) are servo motors 6 to 10. As such, the servo motors that meet all of the conditions (1) to (3) are the servo motors 8 to 10. Here, all of the selected servo motors 8 to 10 can be displayed in the output unit 32 of the display device 30 as selection results. However, it is preferable that the selection candidates ultimately be narrowed down. Accordingly, in the case where a plurality of motors have been selected for each group, the motor, among the selected motors, that has the lowest continuous rated torque and the lowest rated speed may be selected. As a result, the servo motor 8, which has the lowest continuous rated torque at 2 Nm and the lowest rated speed at 2000 min$^{-1}$, is selected, and "servo motor 8" is displayed in the output unit 32 of the display device 30.

As described thus far, with the motor selection method according to the first embodiment, a motor meeting the required specifications can be selected quickly.

In the case where a servo motor meeting the required specifications is selected, it is preferable that the data of the plurality of servo motors contained in the database be sorted in order of the numerical values of each instance of data. Arranging the data of the plurality of servo motors in ascending or descending order of the numerical values makes it possible to quickly detect the servo motor that meets the conditions.

Next, a motor selection method according to a second embodiment will be described. The motor selection method according to the second embodiment differs from the motor selection method according to the first embodiment in that the database contains data pertaining to rotor inertia moment instead of the upper limit values of the load inertia moment, and a coefficient in the following relational expression is set.

Upper limit value of load inertia moment=rotor inertia moment×coefficient

The other sequences of the motor selection method according to the second embodiment are the same as the sequences in the motor selection method according to the first embodiment, and thus detailed descriptions thereof will be omitted.

FIGS. 6A and 6B illustrate examples of data groups of groups 1 and 2 used in the motor selection method according to the second embodiment. For example, the following relationship is established in the case where the upper limit value of the load inertia moment is defined as 10 times the rotor inertia moment.

Upper limit value of load inertia moment=rotor inertia moment×10

Accordingly, setting this coefficient (e.g. 10) in advance makes it possible to calculate the rotor inertia moment from the upper limit value of the load inertia moment. As a result, even in the case where the upper limit value of the load inertia moment has been inputted in the required specifications, a servo motor meeting the required specifications can be selected by using a database containing data pertaining to the rotor inertia moment instead of the upper limit values of the load inertia moment.

Figure 7A:
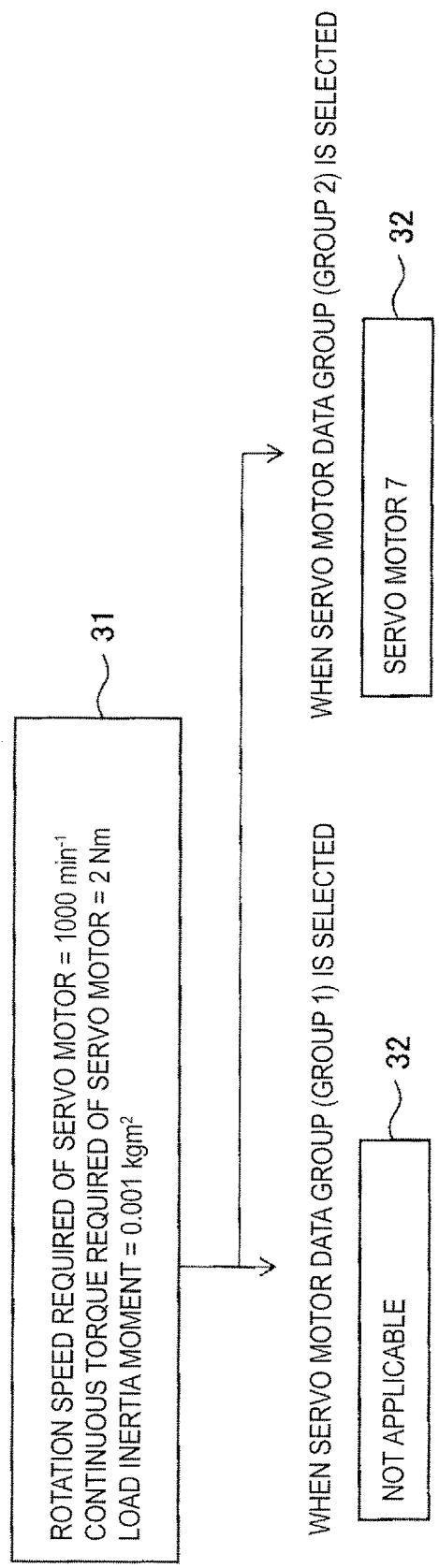
FIG. 7A is a diagram illustrating an example of required motor specifications and an output result from a selected motor, in the motor selection method according to the second embodiment.
Figure 7B:
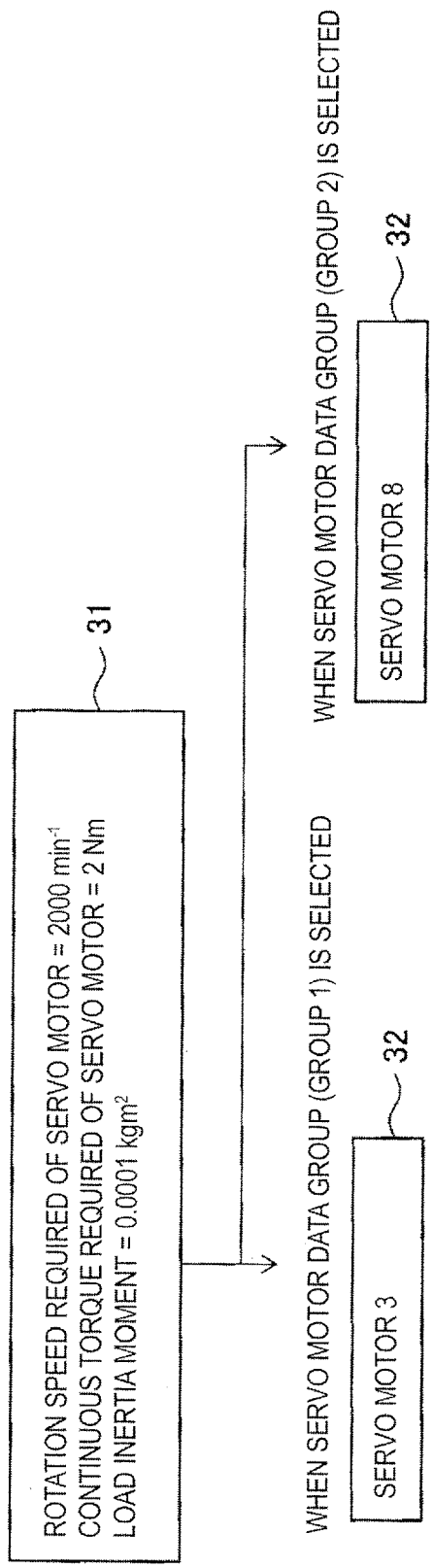
FIG. 7B is a diagram illustrating another example of required motor specifications and an output result from a selected motor, in the motor selection method according to the second embodiment.

FIG. 7A illustrates an example of required motor specifications and an output result from a selected motor, in the motor selection method according to the second embodiment. FIG. 7B illustrates another example of required motor specifications and an output result from a selected motor, in the motor selection method according to the second embodiment. For example, as illustrated in FIG. 7A, according to the required motor specifications inputted in the input unit 31, a result that there is no applicable servo motor is obtained in the case where group 1 has been selected, and "not applicable" is displayed in the output unit 32 of the display device 30, in the same manner as in the sequence described in the first embodiment. On the other hand, in the case where group 2 has been selected, the servo motor 7 is selected, and "servo motor 7" is displayed in the output unit 32 of the display device 30.

Additionally, according to the required motor specifications inputted in the input unit 31 as illustrated in FIG. 7B, the servo motor 3 is selected in the case where group 1 has been selected, and "servo motor 3" is displayed in the output unit 32 of the display device 30, in the same manner as in the sequence described in the first embodiment. On the other hand, in the case where group 2 has been selected, the servo motor 8 is selected, and "servo motor 8" is displayed in the output unit 32 of the display device 30.

In the motor selection method according to the second embodiment, a motor meeting the required specifications can be selected even in the case where data pertaining to rotor inertia moment is stored in the database instead of the upper limit values of the load inertia moment.

Next, a motor selection method according to a third embodiment will be described. The motor selection method according to the third embodiment differs from the motor selection method according to the first embodiment in that a machining load torque required of the motor is obtained (a load torque calculation process), and furthermore, a motor meeting the following condition is selected.

machining load torque≤continuous rated torque

The other sequences of the motor selection method according to the third embodiment are the same as the sequences in the motor selection method according to the first embodiment, and thus detailed descriptions thereof will be omitted.

Figure 8A:
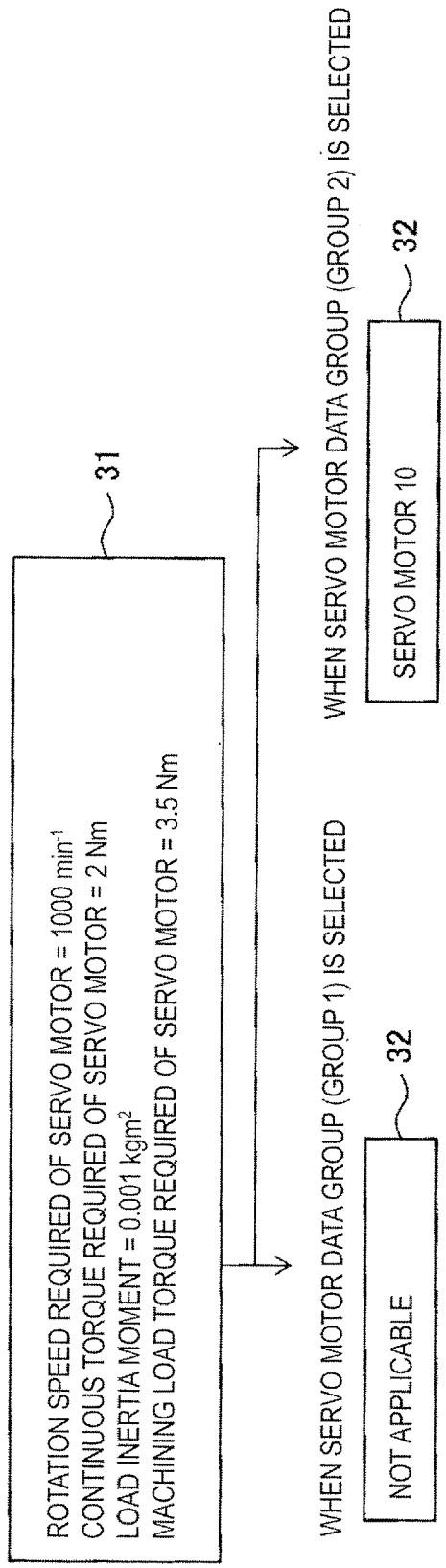
FIG. 8A is a diagram illustrating an example of required motor specifications and an output result from a selected motor, in a motor selection method according to a third embodiment.
Figure 8B:
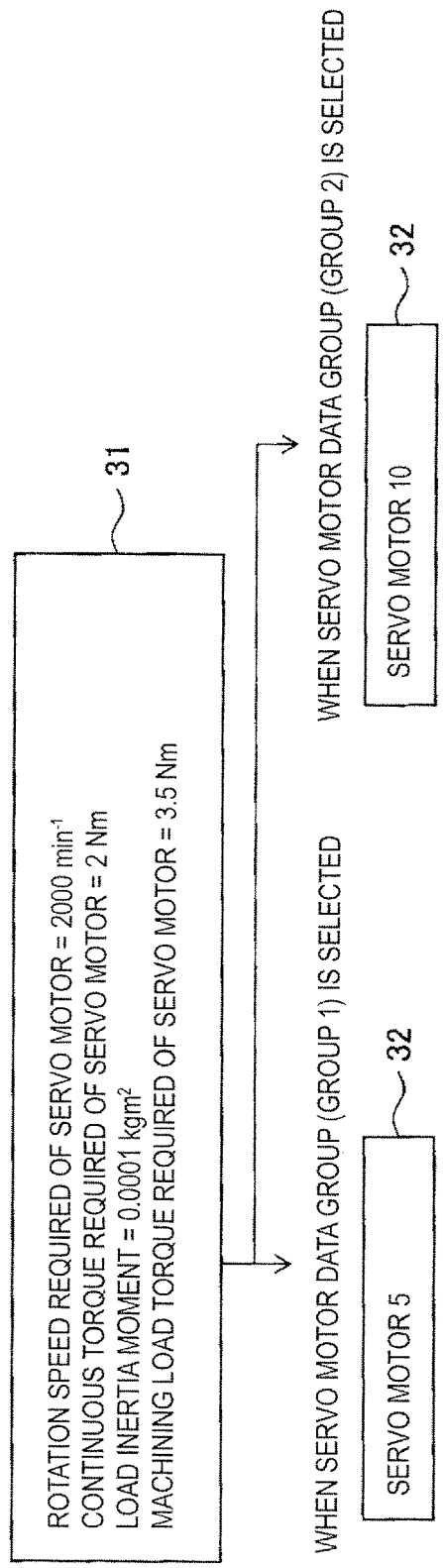
FIG. 8B is a diagram illustrating another example of required motor specifications and an output result from a selected motor, in the motor selection method according to the third embodiment.

FIG. 8A illustrates an example of required motor specifications and an output result from a selected motor, in the motor selection method according to the third embodiment. FIG. 8B illustrates another example of required motor specifications and an output result from a selected motor, in the motor selection method according to the third embodiment. The database illustrated in FIGS. 4A and 4B is used as the database in the motor selection method according to the third embodiment. As illustrated in FIG. 8A, of the required specifications of the servo motor, the rotation speed, the continuous torque, and the load inertia moment are the same as in the first embodiment. On the other hand, in the motor selection method according to the third embodiment, the machining load torque being equal to or less than the continuous rated torque is added as a condition. In the case where the machining load torque required of the servo motor is 3.5 Nm, the servo motor 10 is selected when group 2 is selected as the servo motor data group. This is different from the servo motor 7 selected in the first embodiment, and indicates that a more appropriate servo motor has been selected by taking into account the machining load torque.

Additionally, with respect to the other example of the required specifications of the servo motor illustrated in FIG. 8B, of the required specifications of the servo motor, the rotation speed, the continuous torque, and the load inertia moment are the same as in the first embodiment. On the other hand, in the motor selection method according to the third embodiment, the machining load torque being equal to or less than the continuous rated torque is added as a condition. In the case where the machining load torque required of the servo motor is 3.5 Nm, the servo motor 5 is selected when group 1 is selected as the servo motor data group, and the servo motor 10 is selected when group 2 is selected. This is different from the servo motor 3 selected from group 1 and the servo motor 8 selected from group 2 in the first embodiment, and indicates that a more appropriate servo motor has been selected by taking into account the machining load torque.

As described thus far, in the motor selection method according to the third embodiment, an appropriate motor can be selected by taking into account the machining load torque.

Next, a motor selection method according to a fourth embodiment will be described. The motor selection method according to the fourth embodiment differs from the motor selection method according to the first embodiment in that a machining duty of the motor is calculated (a machining duty calculation process), a machining duty lower limit required specification is obtained (a machining duty specification obtainment process), and furthermore, a motor meeting the following condition is selected.

machining duty≥machining duty lower limit required specification

The other sequences of the motor selection method according to the fourth embodiment are the same as the sequences in the motor selection method according to the first embodiment, and thus detailed descriptions thereof will be omitted.

The machining duty will be described here. In the case of a lathe or a machining center, in a case where a servo motor is used on basic XYZ axes, load torque for carrying out the machining will arise while the machining process is underway. No load torque arises while the machining process is not underway. A ratio of the machining time that ensures a sequential root mean square torque is equal to or less than the continuous rated torque of the motor is called the "machining duty". Although a case of a cutting machine is discussed here, the concept of this duty can be introduced in the case where a large load is temporarily exerted on a servo motor. The machining duty [%] is found as described below.

1) In case where constant load torque Tm≥continuous rated torque of motor

Machining duty=0%

2) In case where machining load torque≤continuous rated torque of motor

Machining duty=100%

3) In all other cases $$\text{machining duty} = \frac{(\text{continuous rated torque of motor})^2 - (\text{constant load torque})^2}{(\text{machining load torque})^2 - (\text{constant load torque})^2} \times 100$$

Accordingly, in the case where the rated continuous torque=3 Nm, the continuous torque required of the servo motor=2 Nm, and the machining load torque required of the servo motor=3.5 Nm, the machining duty is calculated as $(3^2-2^2) \div (3.5^2-2^2)=60\%$.

Additionally, in the motor selection method according to the fourth embodiment, the machining duty lower limit required specification is inputted from the input unit 31 of the display device 30. For example, "50%" is inputted as the machining duty lower limit required specification.

Figure 9A:
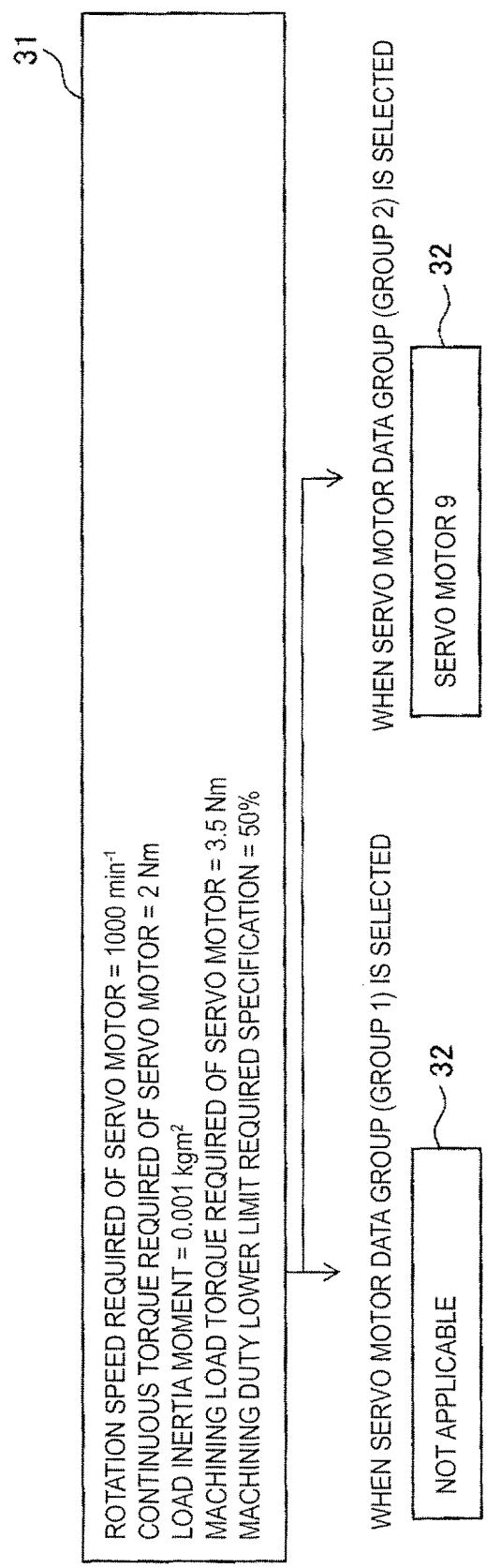
FIG. 9A is a diagram illustrating an example of required motor specifications and an output result from a selected motor, in a motor selection method according to a fourth embodiment.
Figure 9B:
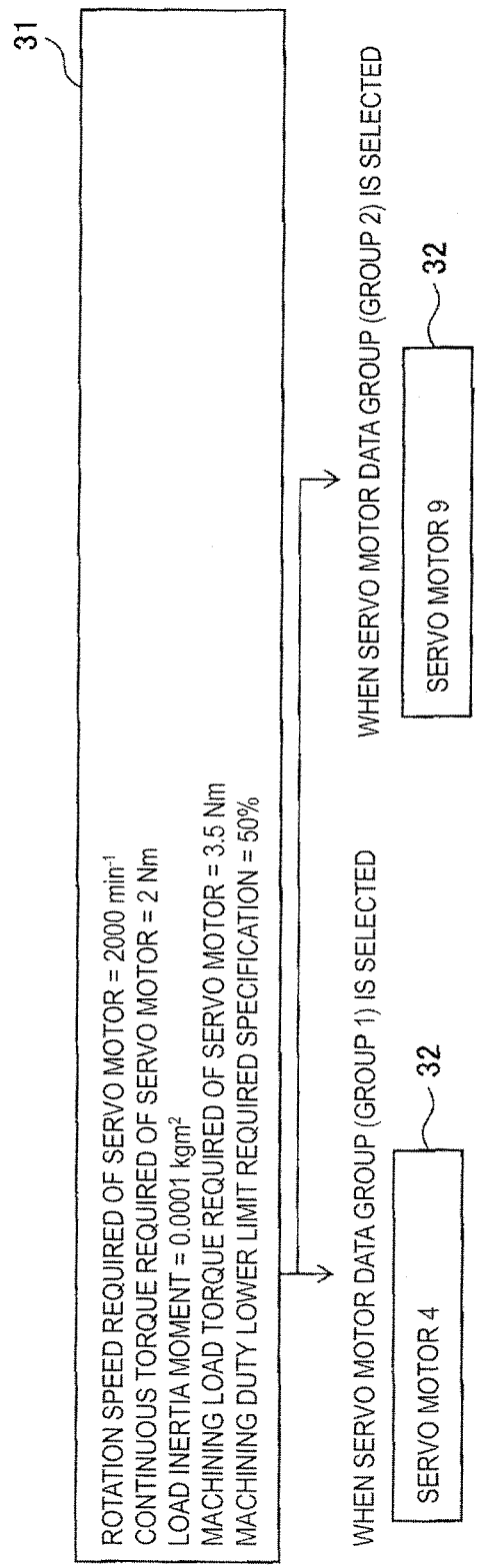
FIG. 9B is a diagram illustrating another example of required motor specifications and an output result from a selected motor, in the motor selection method according to the fourth embodiment.

FIG. 9A illustrates an example of required motor specifications and an output result from a selected motor, in the motor selection method according to the fourth embodiment. FIG. 9B illustrates another example of required motor specifications and an output result from a selected motor, in the motor selection method according to the fourth embodiment. The database illustrated in FIGS. 4A and 4B is used as the database in the motor selection method according to the fourth embodiment. As illustrated in FIG. 9A, of the required specifications of the servo motor, the rotation speed, the continuous torque, and the load inertia moment are the same as in the first embodiment. However, in the motor selection method according to the fourth embodiment, the machining duty being equal to or more than the machining duty lower limit required specification is added as a condition. In the case where the machining load torque required of the servo motor is 3.5 Nm and the machining duty lower limit required specification is 50%, the servo motor 9 is selected when group 2 is selected as the servo motor data group. This is different from the servo motor 7 selected in the first embodiment, and indicates that a more appropriate servo motor has been selected by taking into account the machining load torque and the machining duty lower limit required specification.

Additionally, with respect to the other example of the required specifications of the servo motor illustrated in FIG. 9B, of the required specifications of the servo motor, the rotation speed, the continuous torque, and the load inertia moment are the same as in the first embodiment. However, in the motor selection method according to the fourth embodiment, the machining duty being equal to or greater than the machining duty lower limit required specification is added as a condition. In the case where the machining load torque required of the servo motor is 3.5 Nm and the machining duty lower limit required specification is 50%, the servo motor 4 is selected when group 1 is selected as the servo motor data group, and the servo motor 9 is selected when group 2 is selected. This is different from the servo motor 3 selected from group 1 and the servo motor 8 selected from group 2 in the first embodiment, and indicates that a more appropriate servo motor has been selected by taking into account the machining load torque and the machining duty lower limit required specification.

Next, a motor selection method according to a fifth embodiment will be described. The motor selection method according to the fifth embodiment differs from the motor selection method according to the first embodiment in that the database further contains data pertaining to an instantaneous maximum torque of the motors, the maximum torque required of the motor is obtained (a maximum torque calculation process), and furthermore, a motor meeting the following condition is selected.

maximum torque required of motor≤instantaneous maximum torque

The other sequences of the motor selection method according to the fifth embodiment are the same as the sequences in the motor selection method according to the first embodiment, and thus detailed descriptions thereof will be omitted.

FIG. 10A illustrates an example of a data group in group 1 used in the motor selection method according to the fifth embodiment. FIG. 10B illustrates an example of a data group in group 2 used in the motor selection method according to the fifth embodiment. As illustrated in FIGS. 10A and 10B, the database further contains data pertaining to the instantaneous maximum torque of the servo motors.

Figure 11A:
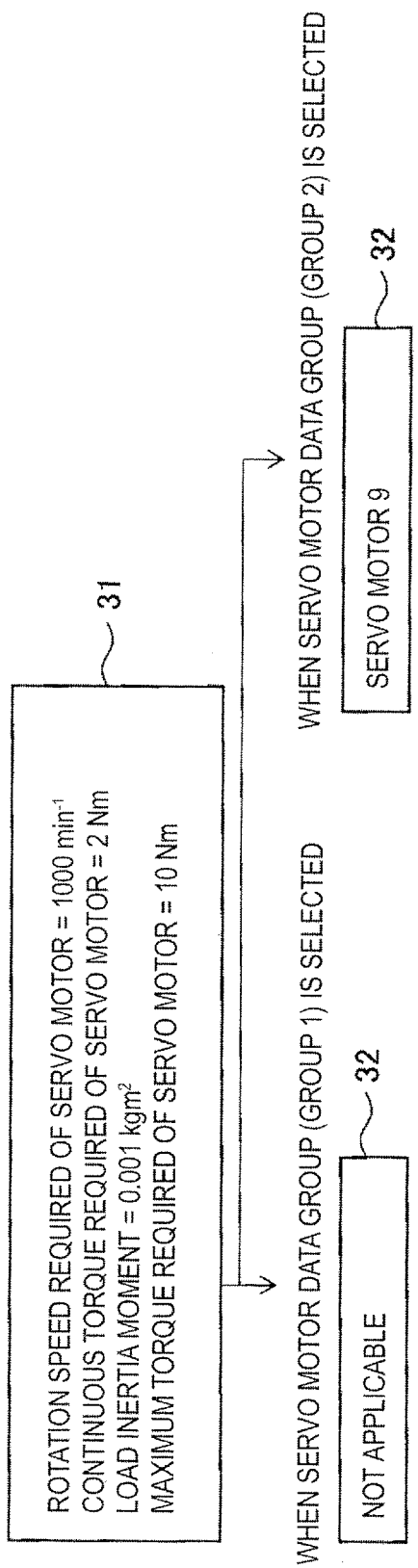
FIG. 11A is a diagram illustrating an example of required motor specifications and an output result from a selected motor, in the motor selection method according to the fifth embodiment.
Figure 11B:
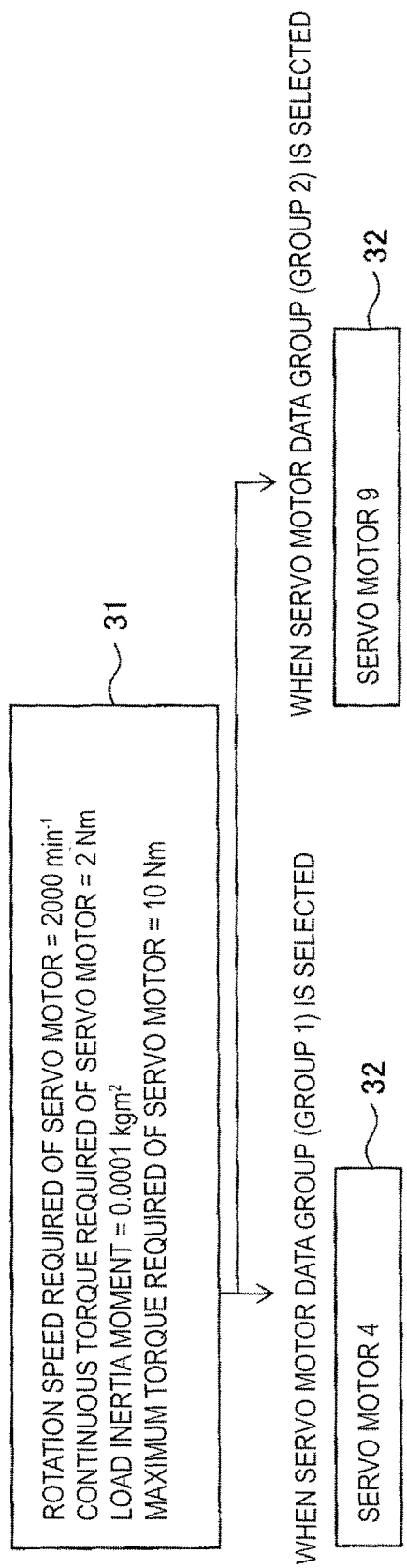
FIG. 11B is a diagram illustrating another example of required motor specifications and an output result from a selected motor, in the motor selection method according to the fifth embodiment.

FIG. 11A illustrates an example of required motor specifications and an output result from a selected motor, in the motor selection method according to the fifth embodiment. FIG. 11B illustrates another example of required motor specifications and an output result from a selected motor, in the motor selection method according to the fifth embodiment. In addition to the rotation speed, the continuous torque, and the load inertia moment required of the servo motor, the maximum torque required of the servo motor is inputted in the input unit 31 of the display device 30, and the computation unit 11 obtains that data. As illustrated in FIG. 11A, of the required specifications of the servo motor, the rotation speed, the continuous torque, and the load inertia moment are the same as in the first embodiment. On the other hand, in the motor selection method according to the fifth embodiment, the maximum torque required of the servo motor being equal to or less than the instantaneous maximum torque is added as a condition. In the case where the maximum torque required of the servo motor is 10 Nm, the servo motor 9 is selected when group 2 is selected as the servo motor data group. This is different from the servo motor 7 selected in the first embodiment, and indicates that a more appropriate servo motor has been selected by taking into account the maximum torque required of the servo motor.

Additionally, with respect to the other example of the required specifications of the servo motor illustrated in FIG.

11B, of the required specifications of the servo motor, the rotation speed, the continuous torque, and the load inertia moment are the same as in the first embodiment. On the other hand, in the motor selection method according to the fifth embodiment, the maximum torque required of the servo motor being equal to or less than the instantaneous maximum torque is added as a condition. In the case where the maximum torque required of the servo motor is 10 Nm, the servo motor 4 is selected when group 1 is selected as the servo motor data group, and the servo motor 9 is selected when group 2 is selected. This is different from the servo motor 3 selected from group 1 and the servo motor 8 selected from group 2 in the first embodiment, and indicates that a more appropriate servo motor has been selected by taking into account the maximum torque required of the servo motor.

As described thus far, in the motor selection method according to the fifth embodiment, an appropriate motor can be selected by taking into account the maximum torque required of the motor.

Next, a motor selection method according to a sixth embodiment will be described. The motor selection method according to the sixth embodiment differs from the motor selection method according to the fifth embodiment in that the database further contains data pertaining to rotation speeds at which the instantaneous maximum torques are obtained, required specifications are obtained for the maximum torque required of the motor and the rotation speed at which the maximum torque is obtained (a rotation speed required specification obtainment process), and furthermore, a motor meeting the following condition is selected.

$$\text{rotation speed at which maximum torque is obtained} \leq \text{rotation speed at which instantaneous maximum torque is obtained}$$

The other sequences of the motor selection method according to the sixth embodiment are the same as the sequences in the motor selection method according to the fifth embodiment, and thus detailed descriptions thereof will be omitted.

FIG. 12A illustrates an example of a data group in group 1 used in the motor selection method according to the sixth embodiment. FIG. 12B illustrates an example of a data group in group 2 used in the motor selection method according to the sixth embodiment. The database further contains data pertaining to the rotation speeds at which the instantaneous maximum torques are obtained, e.g. "(4/0)–(4/500)–(2/1000)". This indicates that the instantaneous maximum torques at rotation speeds of 0, 500, and 1000 $\text{min}^{-1}$ are 4, 4, and 2 Nm, respectively.

Figure 13A:
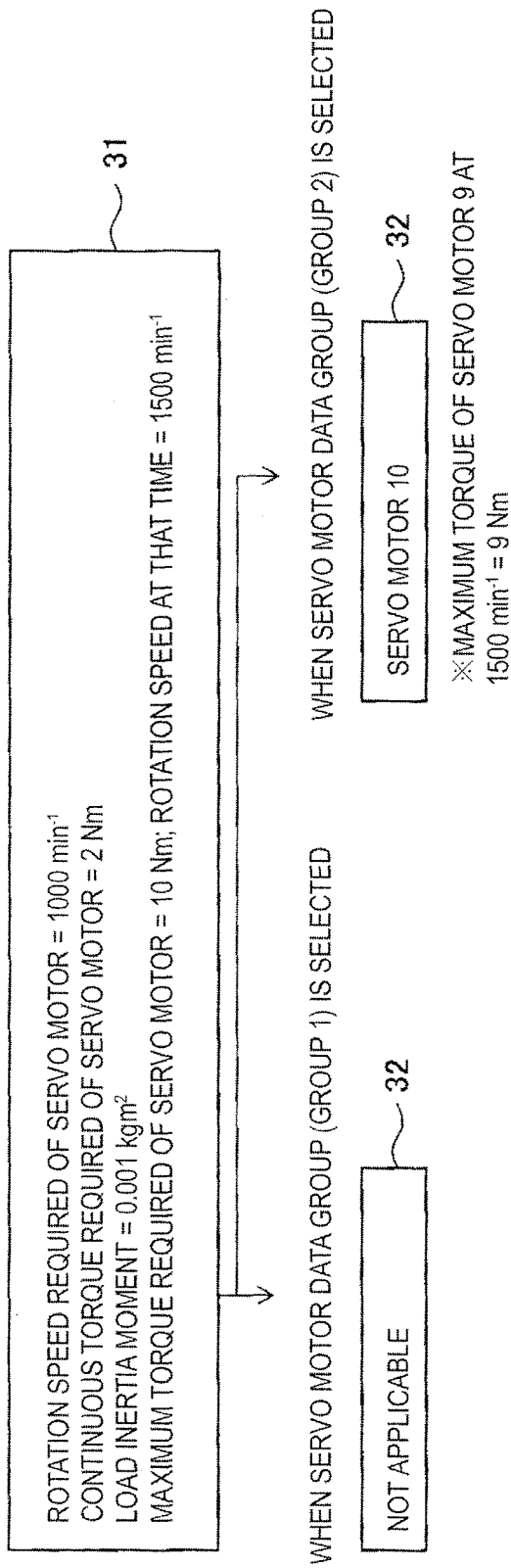
FIG. 13A is a diagram illustrating an example of required motor specifications and an output result from a selected motor, in the motor selection method according to the sixth embodiment.
Figure 13B:
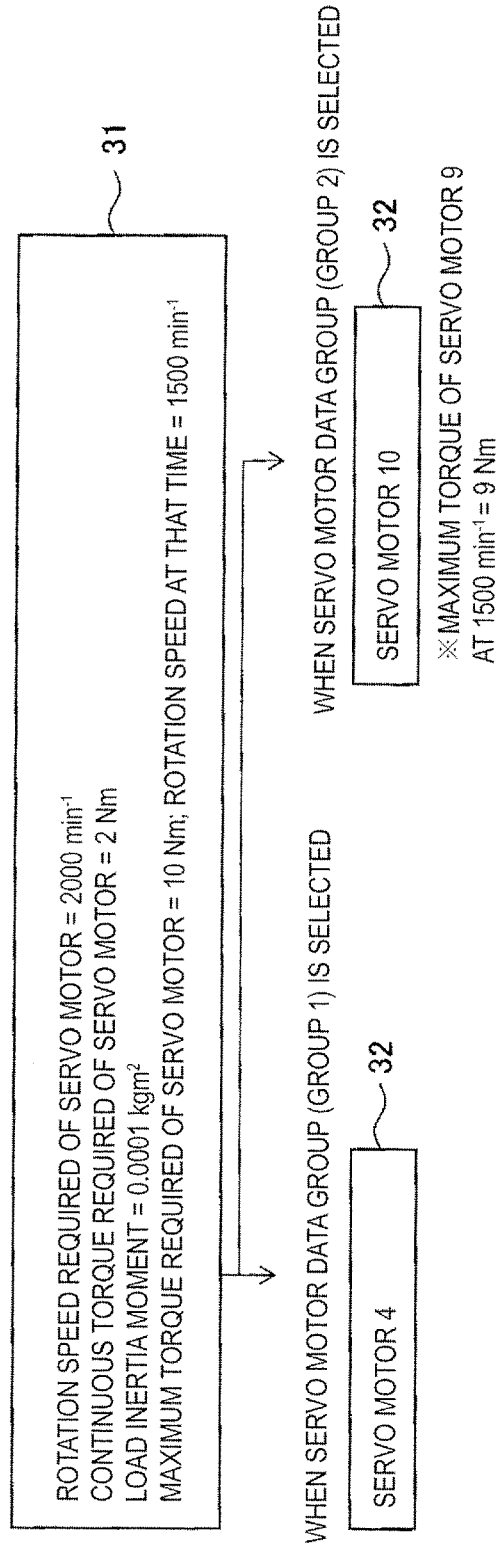
FIG. 13B is a diagram illustrating another example of required motor specifications and an output result from a selected motor, in the motor selection method according to the sixth embodiment.

FIG. 13A illustrates an example of required motor specifications and an output result from a selected motor, in the motor selection method according to the sixth embodiment. FIG. 13B illustrates another example of required motor specifications and an output result from a selected motor, in the motor selection method according to the sixth embodiment. In addition to the rotation speed, the continuous torque, and the load inertia moment required of the servo motor, and the maximum torque required of the servo motor, the rotation speed at which the maximum torque is obtained is inputted in the input unit 31 of the display device 30, and the computation unit 11 obtains that data. As illustrated in FIG. 13A, of the required specifications of the servo motor, the rotation speed, the continuous torque, the load inertia moment, and the maximum torque are the same as in the fifth embodiment. On the other hand, in the motor selection method according to the sixth embodiment, the rotation speed at which the maximum torque is obtained being equal to or less than the rotation speed at which the instantaneous maximum torque is obtained is added as a condition. In the case where the maximum torque required of the servo motor is 10 Nm, and a rotation speed of 1500 $\text{min}^{-1}$ is required at that time, the servo motor 10 is selected when group 2 is selected as the servo motor data group. This is different from the servo motor 9 selected in the fifth embodiment, and indicates that a more appropriate servo motor has been selected by taking into account the rotation speed at which the maximum torque required of the servo motor is obtained.

Additionally, with respect to the other example of the required specifications of the servo motor illustrated in FIG. 13B, of the required specifications of the servo motor, the rotation speed, the continuous torque, the load inertia moment, and the maximum torque are the same as in the fifth embodiment. On the other hand, in the motor selection method according to the sixth embodiment, the rotation speed at which the maximum torque is obtained being equal to or less than the rotation speed at which the instantaneous maximum torque is obtained is added as a condition. In the case where the maximum torque required of the servo motor is 10 Nm, and a rotation speed of 1500 $\text{min}^{-1}$ is required at that time, the servo motor 10 is selected when group 2 is selected as the servo motor data group. This is different from the servo motor 9 selected from group 2 in the fifth embodiment, and indicates that a more appropriate servo motor has been selected by taking into account the rotation speed at which the maximum torque required of the servo motor is obtained.

As described thus far, in the motor selection method according to the sixth embodiment, an appropriate motor can be selected by taking into account the maximum torque required of the motor and the rotation speed at that time.

Next, a motor selection method according to a seventh embodiment will be described. The motor selection method according to the seventh embodiment differs from the motor selection method according to the first embodiment in that an operating pattern is obtained (an operating pattern obtainment process), the root mean square torque required of the motor when executing the obtained operating pattern is calculated (a root mean square torque calculation process), and furthermore, a motor meeting the following condition is selected.

$$\text{root mean square torque required of motor} \leq \text{continuous rated torque}$$

The other sequences of the motor selection method according to the seventh embodiment are the same as the sequences in the motor selection method according to the first embodiment, and thus detailed descriptions thereof will be omitted.

Figure 14A:
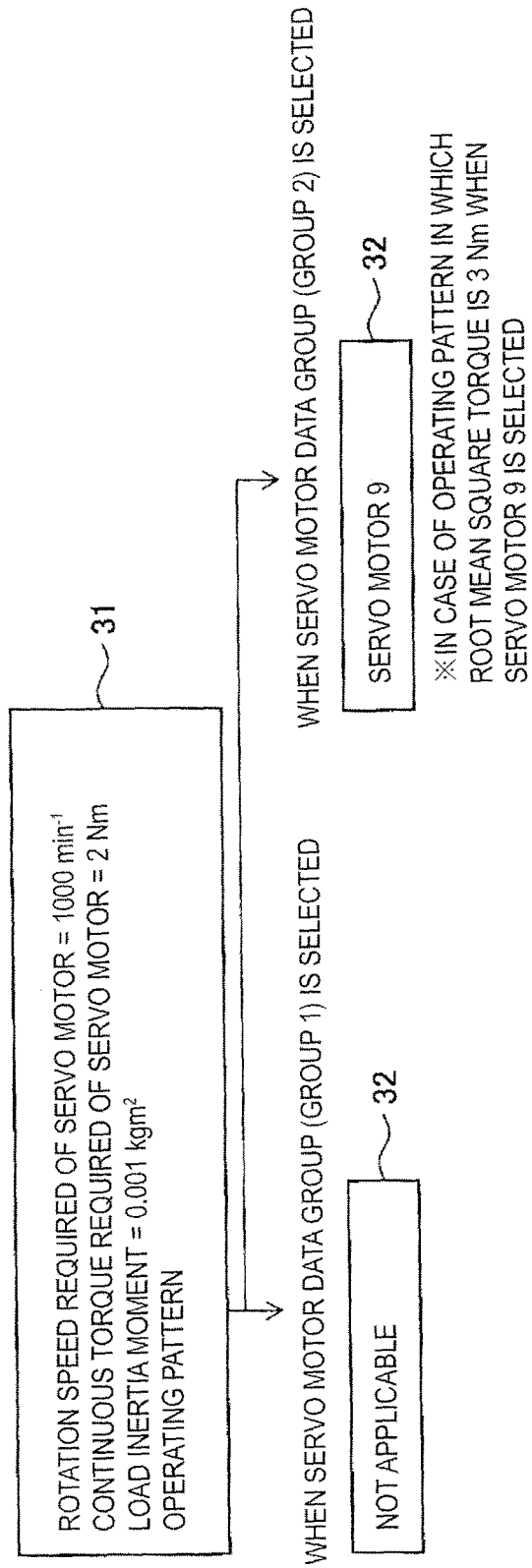
FIG. 14A is a diagram illustrating an example of required motor specifications and an output result from a selected motor, in a motor selection method according to a seventh embodiment.
Figure 14B:
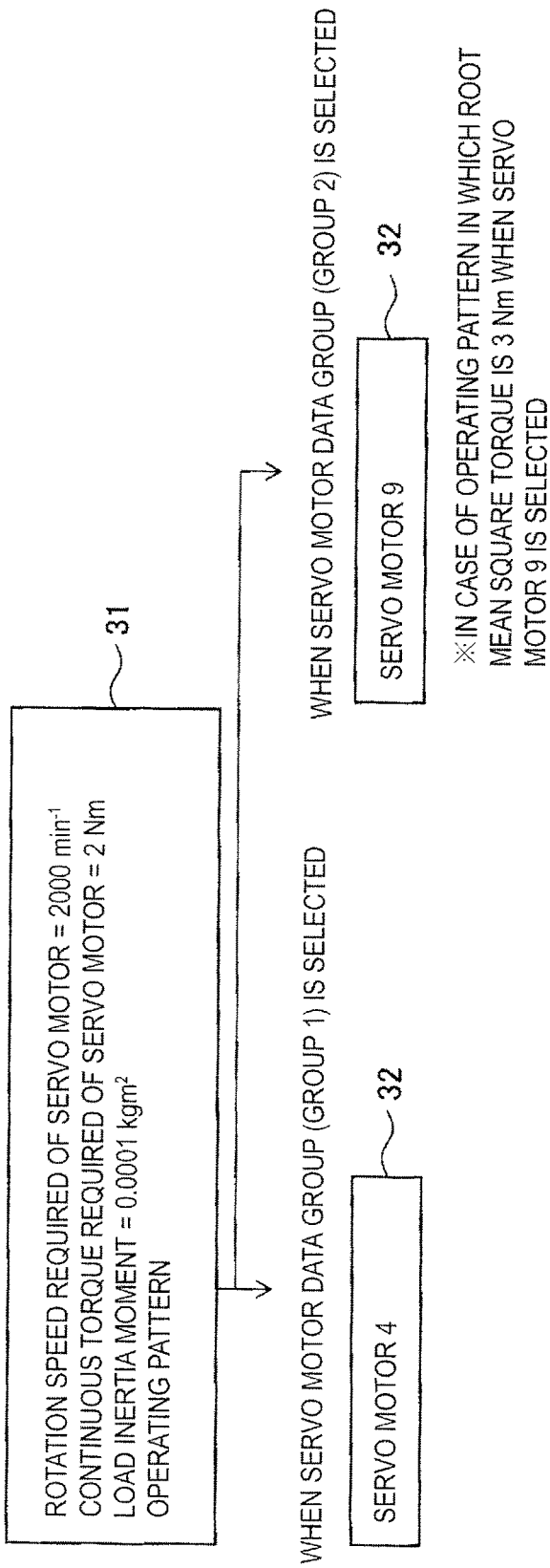
FIG. 14B is a diagram illustrating another example of required motor specifications and an output result from a selected motor, in the motor selection method according to the seventh embodiment.

FIG. 14A illustrates an example of required motor specifications and an output result from a selected motor, in the motor selection method according to the seventh embodiment. FIG. 14B illustrates another example of required motor specifications and an output result from a selected motor, in the motor selection method according to the seventh embodiment. In the motor selection method according to the seventh embodiment, in addition to the rotation speed required of the servo motor, the continuous torque, and the load inertia moment, the operating pattern is inputted in the input unit 31 of the display device 30, and the computation unit 11 obtains that data. As illustrated in FIG. 14A, of the required specifications of the servo motor, the rotation speed, the continuous torque, and the load inertia moment are the same as in the first embodiment.

Figure 15:
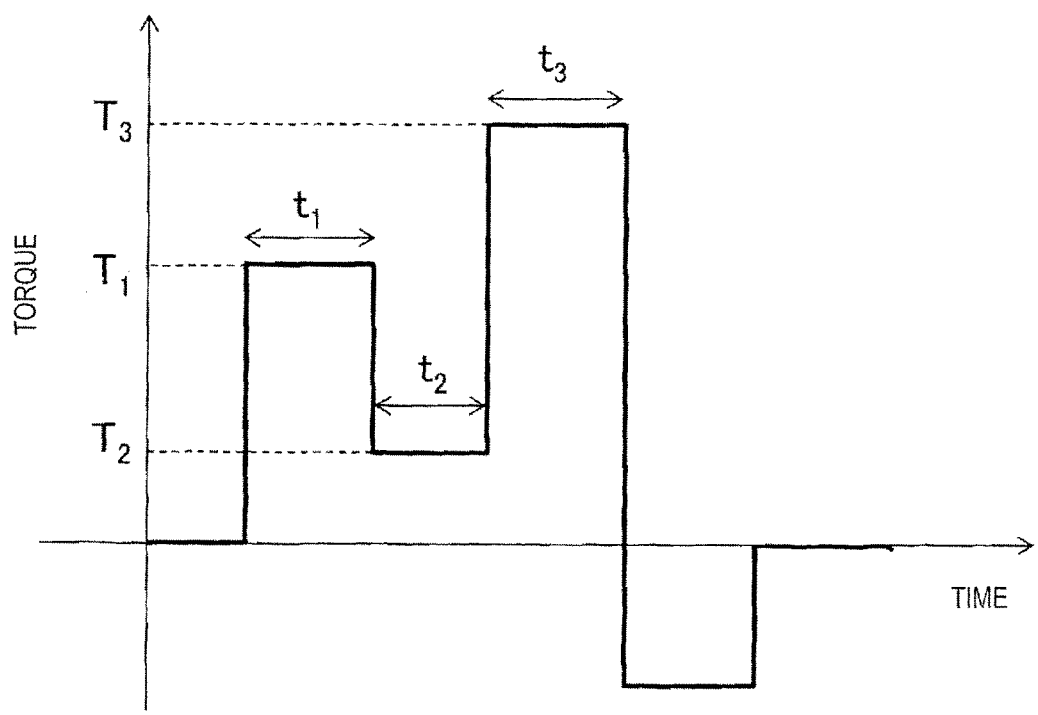
FIG. 15 is a graph illustrating an example of an operating pattern inputted in the motor selection method according to the seventh embodiment.

Here, the operating pattern inputted as the required specifications will be described. FIG. 15 illustrates an example of the operating pattern of the servo motor inputted in the motor selection method according to the seventh embodiment. For example, data of times $t_1$, $t_2$, $t_3$, etc., at which torques $T_1$, $T_2$, $T_3$, etc., are outputted can be inputted as the operating pattern.

Next, the computation unit 11 calculates the root mean square torque required of the motor when executing the obtained operating pattern, according to the following equation.

$$\text{root mean square torque} = \sqrt{((T^2_1 \times t_1 + T^2_2 \times t_2 + T^2_3 \times t_3 + \ldots )/(t_1 + t_2 + t_3 + \ldots ))}$$

The database illustrated in FIGS. 4A and 4B is used as the database in the motor selection method according to the seventh embodiment. As illustrated in FIG. 14A, of the required specifications of the servo motor, the rotation speed, the continuous torque, and the load inertia moment are the same as in the first embodiment. On the other hand, in the motor selection method according to the seventh embodiment, the root mean square torque required of the servo motor being equal to or less than the continuous rated torque is added as a condition. For example, in the case where the inputted operating pattern is an operating pattern in which the root mean square torque is 3 Nm when the servo motor 9 is selected, the servo motor 9 is selected when group 2 is selected as the servo motor data group. This is different from the servo motor 7 selected in the first embodiment, and indicates that a more appropriate servo motor has been selected by taking into account the root mean square torque required of the servo motor when executing the desired operating pattern.

Additionally, with respect to the other example of the required specifications of the servo motor illustrated in FIG. 14B, of the required specifications of the servo motor, the rotation speed, the continuous torque, and the load inertia moment are the same as in the first embodiment. On the other hand, in the motor selection method according to the seventh embodiment, the root mean square torque required of the servo motor being equal to or less than the continuous rated torque is added as a condition. In the case where the inputted operating pattern is an operating pattern in which the root mean square torque is 3 Nm when the servo motor 9 is selected, the servo motor 9 is selected when group 2 is selected. This is different from the servo motor 8 selected from group 2 in the first embodiment, and indicates that a more appropriate servo motor has been selected by taking into account the root mean square torque required of the servo motor when executing the desired operating pattern.

Note that the method for inputting the operating pattern as the required specifications is not limited to a method of inputting the torque and the time for which that torque is outputted. For example, the operating pattern may be drawn directly on a graph expressing a relationship between torque and time using a touch panel or a mouse, a desired operating pattern may be selected from a plurality of operating patterns displayed in the display device 30 in advance, etc.

Next, a motor selection method according to a eighth embodiment will be described. The motor selection method according to the eighth embodiment differs from the motor selection method according to the first embodiment in that the database further contains data pertaining to brake holding torques, torque required of a brake is obtained (a brake torque obtainment process), and furthermore, a motor meeting the following condition is selected.

torque required of brake ≤ brake holding torque

The other sequences of the motor selection method according to the eighth embodiment are the same as the sequences in the motor selection method according to the first embodiment, and thus detailed descriptions thereof will be omitted.

FIG. 16A illustrates an example of a data group in group 1 used in the motor selection method according to the eighth embodiment. FIG. 16B illustrates an example of a data group in group 2 used in the motor selection method according to the eighth embodiment. In addition to data of the continuous rated torque, the rated speed, and the upper limit value of the load inertia moment, the database further contains data of the brake holding torques.

Figure 17A:
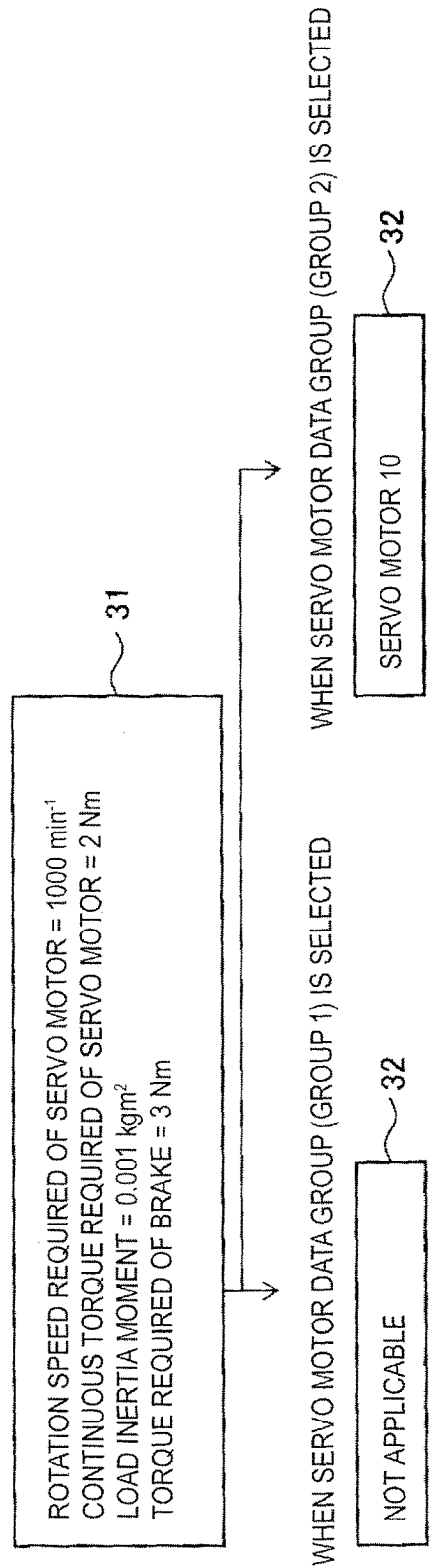
FIG. 17A is a diagram illustrating an example of required motor specifications and an output result from a selected motor, in the motor selection method according to the eighth embodiment.
Figure 17B:
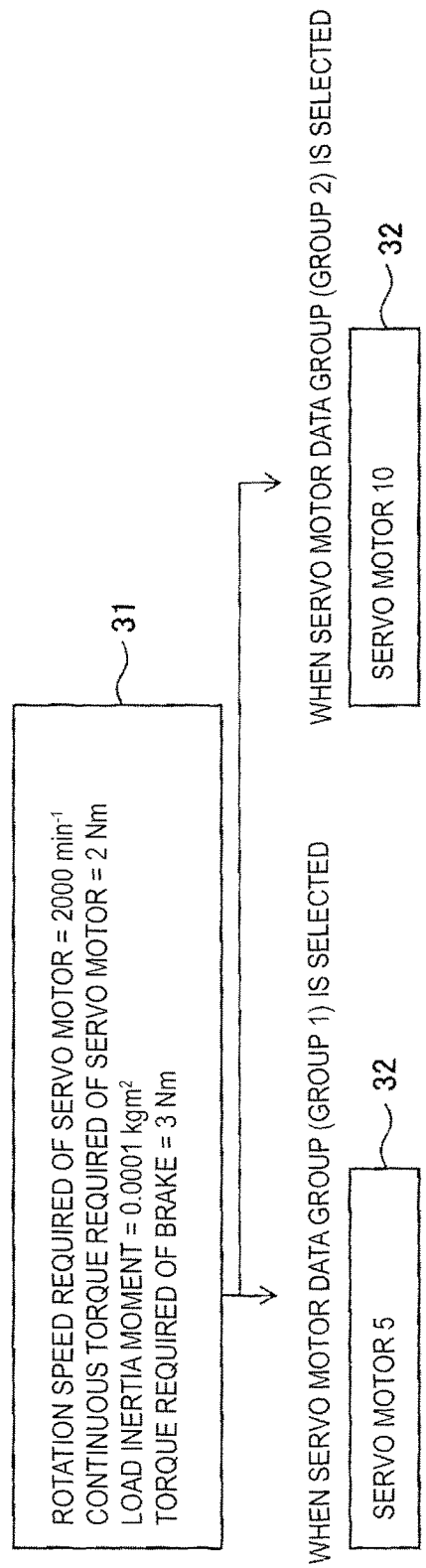
FIG. 17B is a diagram illustrating another example of required motor specifications and an output result from a selected motor, in the motor selection method according to the eighth embodiment.

FIG. 17A illustrates an example of required motor specifications and an output result from a selected motor, in the motor selection method according to the eighth embodiment. FIG. 17B illustrates another example of required motor specifications and an output result from a selected motor, in the motor selection method according to the eighth embodiment. In addition to the rotation speed, the continuous torque, and the load inertia moment required of the servo motor, the torque required of the brake is inputted in the input unit 31 of the display device 30, and the computation unit 11 obtains that data. As illustrated in FIG. 17A, of the required specifications of the servo motor, the rotation speed, the continuous torque, and the load inertia moment are the same as in the first embodiment. On the other hand, in the motor selection method according to the eighth embodiment, the torque required of the brake being equal to or less than brake holding torque is added as a condition. In the case where the torque required of the brake is 3 Nm, the servo motor 10 is selected when group 2 is selected as the servo motor data group. This is different from the servo motor 7 selected in the first embodiment, and indicates that a more appropriate servo motor has been selected by taking into account the torque required of the brake.

Additionally, with respect to the other example of the required specifications of the servo motor illustrated in FIG. 17B, of the required specifications of the servo motor, the rotation speed, the continuous torque, and the load inertia moment are the same as in the first embodiment. On the other hand, in the motor selection method according to the eighth embodiment, the torque required of the brake being equal to or less than the brake holding torque is added as a condition. In the case where the torque required of the brake is 3 Nm, the servo motor 5 is selected when group 1 is selected as the servo motor data group, and the servo motor 10 is selected when group 2 is selected. This is different from the servo motor 3 selected from group 1 and the servo motor 8 selected from group 2 in the first embodiment, and indicates that a more appropriate servo motor has been selected by taking into account the torque required of the brake.

As described thus far, in the motor selection method according to the eighth embodiment, an appropriate motor can be selected by taking into account the torque required of the brake.

With the motor selection method and motor selection program according to examples of the present disclosure, the optimum motor can be selected from many different types of motors easily and in a short amount of time.

What is claimed is:
1. A motor selection method comprising:
referring to a database containing data pertaining to rated speeds, continuous rated torques, and upper limit values of load inertia moment of a plurality of motors;

automatically dividing the data contained in the database into a plurality of groups, based on the upper limit values of load inertia moment;

obtaining, from a user, information pertaining to a rotation speed, a continuous rated torque, and a load inertia moment required of a necessary motor;

selecting, by the user, one group from the plurality of groups; and automatically searching, by using the data included in the selected group, at least one matching motor meeting conditions:

rotation speed of the at least one matching motor≤rated speed of the necessary motor;

continuous torque of the at least one matching motor-≤continuous rated torque of the necessary motor; and load inertia moment of the at least one matching motor required of motor≤upper limit value of load inertia moment of the necessary motor;

in response to a search result comprising the at least one matching motor meeting the conditions, returning the at least one matching motor to the user; and in response to the search result comprising no motor meeting the conditions, notifying the user of the no matching result.

2. The motor selection method according to claim 1, wherein the database contains data pertaining to rotor inertia moment instead of the upper limit values of load inertia moment; and wherein a coefficient in a relational expression:

upper limit value of load inertia moment=rotor inertia moment×coefficient, is set.

3. The motor selection method according to claim 1, further comprising:

obtaining a machining load torque required of the necessary motor, wherein the at least one matching motor further meeting a condition:

machining load torque of the at least one matching motor≤continuous rated torque of the necessary motor, is selected.

4. The motor selection method according to claim 1, further comprising:

calculating a machining duty of the necessary motor; and obtaining a machining duty lower limit required specification of the necessary motor, wherein the at least one matching motor further meeting a condition:

machining duty of the at least one matching motor-≥machining duty lower limit required specification of the necessary motor, is selected.

5. The motor selection method according to claim 1, wherein the database further contains data pertaining to instantaneous maximum torques of the plurality of motors;

wherein the method further comprises obtaining a maximum torque required of the necessary motor; and wherein the at least one matching motor further meeting a condition:

maximum torque required of the at least one matching motor≤instantaneous maximum torque of the necessary motor, is selected.

6. The motor selection method according to claim 5, wherein the database further contains data pertaining to rotation speeds of the plurality of motors at which the instantaneous maximum torques are obtained;

wherein the method further comprises obtaining required specifications for the maximum torque required of the necessary motor and the rotation speed at which the maximum torque required of the necessary motor is obtained; and wherein the at least one matching motor further meeting a condition:

rotation speed at which maximum torque is obtained of the least one matching motor≤rotation speed at which instantaneous maximum torque is obtained of the necessary motor, is selected.

7. The motor selection method according to claim 1, further comprising:

obtaining an operating pattern of the necessary motor; and calculating a root mean square torque required of the necessary motor when executing the obtained operating pattern, wherein the at least one matching motor further meeting a condition:

root mean square torque required of the at least one matching motor≤continuous rated torque of the necessary motor, is selected.

8. The motor selection method according to claim 1, wherein the database further contains data pertaining to brake holding torques;

wherein the method further comprises obtaining a torque required of a brake of the necessary motor; and wherein the at least one matching motor further meeting a condition:

torque required of brake of the at least one matching motor≤brake holding torque of the necessary motor, is selected.

9. The motor selection method according to claim 1, wherein in case where a plurality of matching motors have been found for each group, returning to the user a matching motor having, among the plurality of matching motors, the lowest continuous rated torque and the lowest rated speed.

10. The motor selection method according to claim 1, wherein the data of the plurality of motors contained in the database is sorted by numerical values of each piece of data.

11. A non-transitory computer readable medium including a motor program comprising executable instructions causing a computer to execute:

a database reference process of referring to a database containing data pertaining to rated speeds, continuous rated torques, and upper limit values of load inertia moment of a plurality of motors;

a group dividing process of automatically dividing the data contained in the database into a plurality of groups, based on the upper limit values of load inertia moment;

a required specification obtainment process of obtaining, from a user, information pertaining to a rotation speed, a continuous rated torque, and a load inertia moment required of a necessary motor;

a group selection process of selecting, by the user, one group from the plurality of groups; and a motor searching process of:

automatically searching, by using the data included in the selected group, at least one matching motor meeting conditions:

rotation speed of the at least one matching motor-≤rated speed of the necessary motor;

continuous torque of the at least one matching motor≤continuous rated torque of the necessary motor; and load inertia moment of the at least one matching motor required of motor≤upper limit value of load inertia moment of the necessary motor;

in response to a search result comprising the at least one matching motor meeting the conditions, returning the at least one matching motor to the user; and in response to the search result comprising no motor meeting the conditions, notifying the user of the no matching result.

12. The non-transitory computer readable medium according to claim 11, wherein the database contains data pertaining to rotor inertia moment instead of the upper limit values of load inertia moment; and wherein a coefficient in a relational expression:

upper limit value of load inertia moment=rotor inertia moment×coefficient, is set.

13. The non-transitory computer readable medium according to claim 11, further comprising:

a load torque calculation process of calculating a machining load torque required of the necessary motor, wherein the at least one matching motor further meeting a condition:

machining load torque of the at least one matching motor≤continuous rated torque of the necessary motor, is selected in the motor selection process.

14. The non-transitory computer readable medium according to claim 11, further comprising:

a machining duty calculation process of calculating a machining duty of the necessary motor; and a machining duty specification obtainment process of obtaining a machining duty lower limit required specification of the necessary motor, wherein the at least one matching motor further meeting a condition:

machining duty of the least one matching motor≥machining duty lower limit required specification of the necessary motor, is selected in the motor selection process.

15. The non-transitory computer readable medium according to claim 11, wherein the database further contains data pertaining to instantaneous maximum torques of the plurality of motors;

wherein the program further comprises a maximum torque calculation process of calculating a maximum torque required of the necessary motor; and wherein the at least one matching motor further meeting a condition:

maximum torque required of the at least one matching motor≤instantaneous maximum torque of the necessary motor, is selected in the motor selection process.

16. The non-transitory computer readable medium according to claim 15, wherein the database further contains data pertaining to rotation speeds of the plurality of motors at which the instantaneous maximum torques are obtained;

wherein the program further comprises a rotation speed required specification obtainment process of obtaining required specifications for the maximum torque required of the necessary motor and the rotation speed at which the maximum torque of the necessary motor is obtained; and wherein the at least one matching motor further meeting a condition:

rotation speed at which maximum torque is obtained of the at least one matching motor≤rotation speed at which instantaneous maximum torque is obtained of the necessary motor, is selected in the motor selection process.

17. The non-transitory computer readable medium according to claim 11, further comprising:

an operating pattern obtainment process of obtaining an operating pattern of the necessary motor; and a root mean square torque calculation process of calculating a root mean square torque required of the necessary motor when executing the obtained operating pattern, wherein the at least one matching motor further meeting a condition:

root mean square torque required of the at least one matching motor≤continuous rated torque of the necessary motor, is selected.

18. The non-transitory computer readable medium according to claim 11, wherein the database further contains data pertaining to brake holding torques of the plurality of motors;

wherein the program further comprises a brake torque obtainment process of obtaining a torque required of a brake of the necessary motor; and wherein the at least one matching motor further meeting a condition:

torque required of brake of the at least one matching motor≤brake holding torque of the necessary motor, is selected in the motor selection process.

19. The non-transitory computer readable medium according to claim 11, wherein in case where a plurality of matching motors have been found for each group, returning to the user a matching motor having, among the plurality of matching motors, the lowest continuous rated torque and the lowest rated speed.

20. The non-transitory computer readable medium according to claim 11, wherein in the database reference process, the database is referred to after the data of the plurality of motors contained in the database is sorted by numerical values of each piece of the data.

* * * * *